3,032,408
PROCESS OF PELLETIZING PHOSPHATE ROCK
Arthur N. Baumann, Lakeland, Fla., assignor to International Minerals & Chemical Corporation, a corporation of New York
No Drawing. Filed Aug. 5, 1957, Ser. No. 676,430
11 Claims. (Cl. 71—64)

This invention relates to a method of pelletizing phosphate rock. More particularly this invention relates to the use of alkali metal metaphosphates as binders in the preparation of pellets of phosphate rock from finely ground phosphate rock particles.

In the operation of blast or electric phosphorus reduction furnaces, the charging stock should be substantially free of fine particles in order to prevent loss of the fines in the stack gases and to prevent contamination of the volatile phosphorus-bearing gases produced in the furnace operation. Generally, specifications for minimum particle size of the phosphate rock constituent of the charging stock require that no more than 10% of the rock passes through an 8 mesh screen with the majority of the particles being retained on a 6 mesh screen.

Coarse phosphate rock (pebble) suitable for use as a constituent of reduction furnace charging stock may be recovered from phosphate ore, such as phosphate ore found in Florida and Tennessee. After mining of the ore, coarse particles are separated from the matrix by screening, or other suitable sizing operation, and heated to dryness.

Material remaining after separation of coarse phosphate particles is subjected to an ore beneficiation operation to separate silica and other gangues and to produce a concentrate of fine phosphate rock. The beneficiation operation may include flotation, hydroclassification, tabling, and spiraling steps, or various combinations of these steps. The particular beneficiation steps used will vary with the specific nature of the phosphate ore being treated.

Numerous processes have been developed for the preparation of reduction furnace charging stock by agglomeration of phosphate rock particles which are too small to be used without such treatment. Agglomeration by briquetting or sintering has been found to be expensive. In other processes, phosphate rock particles are agglomerated by heating in the presence of a binder such as phosphoric acid, sulfuric acid, bentonite or other binder. Generally these processes have been undesirable because they are expensive, or because a high calcination temperature, i.e., between 2000 and 2400° F., is necessary to produce agglomerates of the desired degree of hardness. In addition, the binder may be undesirable because an additional impurity is introduced into the reduction furnace charging stock.

It is a primary object of the invention to overcome the disadvantages of the previously known methods of agglomerating phosphate rock.

It is another object of the invention to provide improved pelletized phosphate rock suitable for use as a constituent of charging stock for phosphorus reduction furnaces.

Another object of the invention is to prepare pellets of phosphate rock which resist breaking and dusting during shipment and handling.

Still another object of the invention is to provide an economical method of pelletizing phosphate rock at relatively low temperatures while minimizing the introduction of impurities into the phosphorus furnace charging stock.

These and other objects will become apparent from the following detailed description of the invention.

It has now been discovered that pellets of phosphate rock suitable for use as a constituent of charging stock for phosphorus reduction furnaces may be prepared by intimately mixing phosphate rock, a small amount of at least one alkali metal metaphosphate, and sufficient water to provide between about 10% and about 20% by weight of water in the mixture, tumbling the mixture to form pellets of the desired size, and slowly heating the pellets at a temperature above about 230° F. until substantially free of moisture.

More in detail, a phosphate rock concentrate, which has been recovered from phosphate ore by conventional beneficiation operations and which passes through a 14 mesh screen may be pelletized in accordance with the novel process. It is preferred to use a concentrate having a bone phosphate of lime (BPL) content in excess of about 68%, since specifications for phosphate rock used in electric reduction furnaces generally require this minimum BPL concentration. However, lower or higher grade concentrates may be used in the preparation of the pellets, if desired, since the grade is not a critical factor in successfully pelletizing the rock according to the instant novel process.

Phosphate rock used in the novel process should not be coarser than about 14 mesh and preferably not coarser than about 20 mesh in order to produce pellets having the desired resistance to dusting and breaking. At least about 30% by weight of the particles should pass through a 100 mesh screen and preferably between about 30% and about 60% by weight of the particles should pass through a 200 mesh screen. In the event the phosphate rock concentrate recovered in the beneficiation of phosphate ore is coarser than the above mentioned particle sizes, the concentrate may be comminuted to obtain particles having the desired size distribution. As an alternative, coarse phosphate rock particles may be blended with fine phosphate rock particles to form a feed material having the desired particle size distribution, as described more fully hereinafter.

In the drying or comminuting of phosphate rock concentrates recovered by beneficiation of phosphate ores, a significant quantity of phosphate dust, generally 100% being less than about 325 mesh, is recovered from stack gases by the use of suitable dust collecting equipment. Phosphate dust recovered in these operations may be blended with coarse or partially comminuted phosphate rock concentrate to form a mixture having the desired particle size distribution. For example, pellets having the desired degree of hardness may be prepared when comminuted phosphate rock concentrate, which is about 97% —48 mesh and about 12% —200 mesh, is mixed with —325 mesh phosphate dust in the ratio of about 200 pounds of dust per 2000 pounds of concentrate, and the mixture is pelletized in accordance with the instant novel process. However, greater or lesser amounts of dust may be used, depending upon the particle size distribution of the coarse phosphate rock.

Alkali metal phosphates selected from the group consisting of alkali metal metaphosphates and alkali metal polymetaphosphates are contemplated for use as binders in the present invention. Compounds that may be used in the instant novel process include alkali metal metaphosphate, alkali metal trimetaphosphate, alkali metal tetrametaphosphate, alkali metal hexametaphosphate, other polymerized alkali meta metaphosphates or mixtures of these compounds. Either the sodium or potassium salts or mixtures of these salts may be employed.

In addition, compounds such as the mono- and dialkali metal phosphates, which form alkali metal metaphosphates or alkali metal polymetaphosphates in situ when heated to temperatures above about 500° F. are also contemplated for use in the instant invention. For example, an aqueous monosodium phosphate solution is prepared by dissolving sodium carbonate in an aqueous phosphoric acid solution in an amount to give a $Na_2O:P_2O_5$ mole ratio between about 1:1 and about 1.4:1. This solution, containing between about 92% and about 98% water, may be used to prepare moist pellets from phosphate rock fines, and the pellets heated to a temperature above about 1000° F. whereby sodium metaphosphate is formed in situ. The method of pelletizing and heating the pellets is described more fully hereinafter.

The terms "alkali metal metaphosphate" and "alkali metal polymetaphosphate," or the corresponding sodium or potassium salts thereof, as used herein and in the appended claims, are intended to include these compounds extraneously produced or formed in situ.

It is preferred to use a water soluble alkali metal metaphosphate having an alkali metal oxide to $P_2O_5$ mole ratio of between about 1.0:1 and about 1.4:1. Specifically, a water soluble sodium metaphosphate having an $Na_2O$ to $P_2O_5$ mole ratio of about 1.3:1 is used in the instant novel process. Crude sodium metaphosphate comprising essentially a mixture of sodium hexametaphosphate and sodium tetrametaphosphate is a suitable bonding agent for use in the process.

Alkali metal phosphates such as mono- and dihydrogen alkali metal phosphates may react chemically with the phosphate rock during subsequent heating of the pellets and therefore may be somewhat less desirable for use in pelletizing than alkali metal metaphosphates. When alkali metal tripolyphosphates are used as a binder, the temperature necessary to obtain suitable binding of the phosphate rock in pellet form is generally higher than the temperature required when an alkali metal metaphosphate having an alkali metal oxide to $P_2O_5$ mole ratio of less than about 1.4:1 is used.

In another embodiment of the invention, a suitable sodium metaphosphate binder may be prepared by reacting impure phosphoric acid having a $P_2O_5$ content of about 26% by weight with sodium chloride in an amount to provide a $Na_2O$ to $P_2O_5$ mole ratio of between about 1:1 and about 1.2:1. The resulting solution is heated in a suitable furnace at a temperature of about 1700° F. to vaporize substantially all of the chlorine-bearing compounds. The resulting melt is withdrawn from the furnace and rapidly quenched in water to produce a crude sodium metaphosphate solution containing calcium, iron and aluminum impurities. After determining the total $P_2O_5$ content in solution, and subtracting from the total the amount of $P_2O_5$ combined with iron and aluminum impurities and assuming that the remaining $P_2O_5$ content is combined with sodium as the metaphosphate, the corrected $Na_2O$ to $P_2O_5$ mole ratio of the solution is of the order of about 1.33:1.

Sodium metaphosphate may also be prepared by reacting a sodium compound such as sodium carbonate or sodium hydroxide with phosphoric acid in a manner similar to the process described above employing sodium chloride.

Alkali metal metaphosphate in the form of an aqueous solution is mixed or mulled with the phosphate rock in an amount equivalent to between about 5 and about 50 pounds of metaphosphate per ton of rock and preferably between about 10 and about 20 pounds per 2000 pounds of phosphate rock.

The amount of water used in pelletizing the phosphate rock should be between about 10% and about 20% and preferably between about 11% and about 18% by weight of the mixture and may be added simultaneously with the metaphosphate binder by simply adjusting the concentration of the metaphosphate in the aqueous solution to between about 2% and about 15%, preferably between about 4% and about 8% by weight. When less than about 10% by weight of water is used there is insufficient water present to cause the desired degree of agglomeration of the phosphate rock particles. When greater than about 20% by weight of water is used, a substantial cracking of the pellets occurs during the subsequent drying step, thereby reducing the strength of the pellets. It is preferred to add water in the form of an aqueous alkali metal metaphosphate solution, but any water already present in the phosphate rock must be taken into account in adjusting the concentration of metaphosphate solution employed.

Phosphate rock fines either with or without the addition of phosphate dust, may be mixed with an aqueous solution of sodium metaphosphate in a suitable blending apparatus such as a pug mill or muller to form a substantially homogeneous mixture. The mixture may be introduced into a conventional rotating drum pelletizer to form pellets which are retained on about an 8 mesh screen.

In a preferred embodiment of the invention, moist pellets are prepared in a pan pelletizer, commonly known as a balling disc, and sometimes referred to as a "flying saucer" in the pelletizing art. A pan pelletizer of the type contemplated for use in pelletizing phosphate rock in accordance with the instant invention is described in Engineering and Mining Journal, vol. 158, No. 6a, mid-June 1957, page 117.

The pan pelletizer is an inclined rotating disc or pan. Phosphate rock fines with or without phosphate dust are introduced at a point preferably below the central axis at a distance of about ½ of the pan radius from the center, and at a point near but removed from the bottom surface of the pan. The pan may be rotated either clockwise or counterclockwise. An aqueous alkali metal metaphosphate solution is sprayed through one or more jets adjacent to the wall of the pan in an area located in the 90°–180° quadrant, preferably between about 125° and about 180°, when the pan is rotated clockwise. however, phosphate rock and metaphosphate solution may be introduced at any location in the pan pelletizer that will give satisfactory pelletization.

The slope and speed of the disc necessary to produce pellets of between about −½″ and +6 mesh will vary with the diameter of the pan and the feed rate. When a feed rate of about 300 to 500 pounds per hour of phosphate rock is fed to a pan pelletizer having a diameter of about 3¼ feet, it has been found that a speed of about 27 revolutions per minute and a pan slope of about 55° will produce pellets which are substantially all between −½″ and +6 mesh.

One advantage in the use of the pan pelletizer is that pelletizing may be accomplished without premixing phosphate rock and binder, thereby eliminating the need for the blending step. A further advantage of the pan pelletizer is that the pellets are of substantially uniform size, thereby eliminating the need for a subsequent sizing step to remove undersize and oversize pellets.

Moist pellets from the pelletizer are conveyed to a suitable heating apparatus, such as a rotating kiln, to remove substantially all of the moisture present therein and to form pellets which are resistant to dusting and breaking. A too rapid heating of the pellets should be avoided in order to prevent formation of pellets having a hard dry surface and a moist center. Pellets of this type tend to disintegrate and form fines which are subjected to the high temperatures used in the reduction furnace. For this reason, it is preferred to feed the moist pellets countercurrent to the flow of combustion gases in the heating apparatus in order to obtain a slow and gradual heating of the pellet and thereby obtain a more complete vaporization of water. In order to produce pellets having the desired resistance to dusting and breaking, the moist pellets are heated to a temperature in excess of about 230° F., and preferably between about 500° F. and about 1200° F. However, higher temperatures may be used if desired.

Heating of the moist pellets should be slow and gradual in order to obtain substantially complete removal of their water content. The temperature of the moist pellets should be increased at an average rate of about 10° F. per minute and preferably no more than about 25° F. per minute. However, the moisture content, pellet size, drying time and final temperature are factors which control the optimum rate of increasing the temperature of the moist pellets. For example, when pellets of the size range of ½" to +6 mesh containing about 12% moisture are heated from ambient temperature to a final temperature of about 750° F., increasing the temperature of the pellets at a rate of about 15° F. per minute for about 45 minutes will remove substantially all of the moisture present in the pellets.

After cooling the dry pellets in air they are shipped or stored for use as a constituent of charging stock for phosphorus reduction furnaces. If desired, pellets discharged from the heating apparatus may be subjected to a sizing step in which undersize and oversize pellets are separated as by screening. Undersize particles may be recycled to the pelletizing step. Oversize pellets may be comminuted and recycled to the sizing step.

The invention will be further understood by reference to the following examples which are given by way of illustration and without any intention that the invention be limited thereto. All parts and percentages are by weight unless otherwise specified.

*Example I*

Florida phosphate ore was mined, deslimed, sized and beneficiated by conventional froth flotation methods to recover a phosphate rock concentrate having a BPL content of about 67.4% by weight (about 30.8% $P_2O_5$ by weight). The concentrate was dried and comminuted. Approximate screen analysis of the comminuted concentrate on a dry basis was as follows:

| Screen analysis: | Percent |
| --- | --- |
| +20 | 0.1 |
| −20+35 | 0.7 |
| −35+48 | 2.2 |
| −48+65 | 8.3 |
| −65+100 | 36.5 |
| −100+200 | 41.0 |
| −200 | 11.2 |

Solid reagent grade sodium metaphosphate (36.4% $Na_2O$ and 62.3% $P_2O_5$) was dissolved in water to form an aqueous 3.5% sodium metaphosphate solution. This solution was blended with the above-mentioned comminuted phosphate rock concentrate in the ratio of about 15 parts of sodium metaphosphate per 2000 parts of phosphate rock and introduced into an inclined rotating drum pelletizer to produce pellets having a particle size of about minus 1" plus 8 mesh. Moist pellets were partially dried in the rotating drum and then placed in an electric oven at a temperature of about 230° F. until substantially free of moisture.

The dried pellets were cooled and tested to determine resistance of the pellets to dusting and breaking. Pellet strength was measured in a degradation apparatus designed to impart load, friction and impact forces to the pellets similar to the forces encountered by the pellets in shipment and furnacing operations. Ten cylindrical glass jars, each having a depth of about 3 inches and a volume of about 9 fluid ounces, were secured to the top surface of a wooden plate having a length of about 24 inches, a width of about 4 inches and a thickness of about 2 inches. A metal plate having the same dimensions as the wooden plate was secured to the bottom of the wooden plate to form the hammer. Two pivot arms, one secured to each end of the hammer, extended parallel from the side of the hammer, were each secured to a pivot means. Positioned below the hammer was an anvil having approximately the same dimensions as the hammer. A motor-driven cam, acting on a bracket secured to one side of the hammer, raised the hammer a distance of about 1 inch and then let the hammer fall freely to the anvil. The cam speed operated to raise the hammer at the rate of about 75 times per minute. Each jar was filled with pellets having a particle size of plus 8 mesh. The jars were covered and subjected to the hammer action for a period of about one hour. At the end of the period, each sample was screened on an 8 mesh screen. The percent degradation was calculated by dividing the weight of the minus 8 mesh material by the weight of the original sample and multiplying the quotient by 100.

Pellets prepared in accordance with the procedure of this example were found to have a degradation percentage of about 2.5% by weight when subjected to the above-described degradation test. Chemical analyses of the pellets were as follows.

| Compound: | Percent |
| --- | --- |
| $P_2O_5$ | 31.2 |
| $Fe_2O_3$ | 0.74 |
| $Al_2O_3$ | 1.39 |

The $P_2O_5$ content of the phosphate rock was increased from 30.8 to 31.2 when sodium metaphosphate was used as a binder as described in this example.

*Example II*

Florida phosphate ore was mined, deslimed, sized and beneficiated by conventional froth flotation methods to recover a phosphate rock concentrate having a BPL content of about 77% by weight (34.6% $P_2O_5$ by weight). This concentrate was dried and comminuted. Approximate screen analysis of the concentrate on a dry basis was as follows.

| Screen analysis: | Percent |
| --- | --- |
| +80 | 14.0 |
| −80 +100 | 8.0 |
| −100 +200 | 23.6 |
| −200 +325 | 23.4 |
| −325 | 31.0 |
| | 100.0 |

An aqueous sodium metaphosphate solution was prepared by heating an impure phosphoric acid containing about 26% $P_2O_5$, about 1.31% $Al_2O_3$ and about 0.71% $Fe_2O_3$ with solid sodium chloride in an amount to provide a $Na_2O:P_2O_5$ mole ratio of about 1.1:1. The mixture was heated to about 1700° F. in a direct fired furnace for a period of about one hour to remove by volatilization substantially all of the chlorine-bearing compounds. The melt produced thereby was rapidly quenched with water and diluted to produce an aqueous sodium metaphosphate solution containing about 7% of $NaPO_3$ by weight. The $Na_2O:P_2O_5$ mole ratio of the solution after correcting for iron and aluminum impurities in the solution was about 1.33:1.

Phosphate rock concentrate prepared as described above was blended with phosphate rock dust which was recovered from stack gases produced in the drying of phosphate rock concentrate. All of the phosphate rock dust was less than about 325 mesh in size. The phosphate rock concentrate at the rate of about 270 pounds per hour and phosphate rock dust at the rate of about 18 pounds per hour were blended in a screw conveyor and fed continuously into an inclined pan pelletizer. The pan pelletizer, having a diameter of about 3 feet, 3 inches, a depth of about 6 inches and having a lip of about 4 inches in width and a depth of about 6 inches, was rotated clockwise at about 27 r.p.m. The angle made by the central axis of the pan pelletizer with a horizontal plane was about 55°.

The blend of solid phosphate material was introduced at a point about 3 inches below the central axis of the pan pelletizer, adjacent to the back surface of the pan pelletizer.

A 7% solution of sodium metaphosphate solution prepared as described above was continuously introduced into the pan pelletizer at a point adjacent to the bottom edge of the pan at approximately the 5 o'clock position. The sodium metaphosphate solution was introduced continuously in an amount equivalent to about 16 pounds of NaPO₃ per 2000 pounds of phosphate rock.

Moist pellets, substantially all of which were between about −½ inch and plus 8 mesh, were discharged continuously from the pan pelletizer, at the rate of about 326 pounds per hour, to the feed end of a rotating kiln fired countercurrently. The kiln had a length of about 20 feet and an inside diameter of about 15 inches. The slope of the kiln was about 0.22 inch per foot, and the kiln was operated at a speed of about 4 r.p.m. Moist pellets having a moisture content of about 11.7% by weight were continuously passed through the kiln and discharged at a temperature of about 750° F., the retention time being about 40 minutes. Hot, dry pellets were discharged from the kiln at the rate of about 282 pounds per hour. After cooling the pellets, two samples of about 250 grams each were tested in the degradation apparatus described in Example I. Average degradation of the pellets was found to be about 1%.

*Example III*

Phosphate rock concentrate prepared as in Example I, but having a BPL content of about 67% by weight (30.5% $P_2O_5$), was dried and comminuted. Approximate screen analysis of the concentrate on a dry basis was as follows.

Screen analysis: | Percent
--- | ---
+80 | 8.0
−80 +100 | 5.0
−100 +200 | 24.0
−200 +325 | 35.7
−325 | 27.3
| 100.0

Phosphate rock concentrate at the rate of 275 pounds per hour and phosphate rock dust of Example II at the rate of 77 pounds per hour were blended in a screw conveyor and fed to the pan pelletizer described in Example II. Aqueous sodium metaphosphate solution prepared as in Example II, but having a concentration of about 5% NaPO₃, was fed to the pan pelletizer as in Example II in an amount equivalent to about 11 pounds of NaPO₃ per 2000 pounds of phosphate rock. Pellets, all of which were substantially between about minus ⅜ inch and plus 8 mesh and having a moisture content of about 11.4%, were continuously discharged from the pan pelletizer at the rate of about 322 pounds per hour. Moist pellets were continuously fed to the rotary kiln under the conditions described in Example II, with the exception that the pellets were discharged from the kiln at a temperature of about 650° F. Pellets were discharged from the kiln at the rate of about 285 pounds per hour. After cooling the pellets, two samples were separated for testing in the degradation machine described in Example I. The average degradation of the pellets was found to be about 1%.

*Example IV*

Phosphate rock concentrate prepared as in Example I having a BPL concentration of about 77% (34.6% $P_2O_5$) was dried and comminuted. Approximate screen analysis of the comminuted concentrate on a dry basis was found to be as follows.

Screen analysis: | Percent
--- | ---
+80 | 1.7
−80+100 | 3.1
−100+200 | 17.5
−200+325 | 45.3
−325 | 32.4
| 100.0

The dry, comminuted phosphate rock concentrate was introduced continuously into the pelletizer described in Example II at the rate of about 280 pounds per hour. An aqueous sodium metaphosphate solution prepared as in Example II, but having a concentration of about 5% NaPO₃, was introduced continuously into the pan pelletizer in an amount equivalent to about 15 pounds of sodium metaphosphate per 2000 pounds of phosphate rock. Pellets having a moisture content of about 11% were continuously discharged from the pan pelletizer at the rate of about 319 pounds per hour. Substantially all of the pellets had a particle size of minus ½ inch and plus 8 mesh. Moist pellets from the pan pelletizer were fed to the rotating kiln of Example II. Pellets were discharged from the kiln at a temperature of about 1000° F. at the rate of about 274 pounds per hour, the retention being about 40 minutes. After cooling the pellets discharged from the kiln, two samples were separated for degradation tests as described in Example I. The average percent degradation of the pellets was found to be about 2.6%.

What is desired to be secured by Letters Patent is:

1. The method of preparing pellets from phosphate rock particles which comprises the steps of admixing phosphate rock particles, water, and at least one alkali metal metaphosphate selected from the group consisting of alkali metal metaphosphates, alkali metal polymetaphosphates, and mixtures thereof, said alkali metal metaphosphate being added to said mixture in an amount equivalent to between about 5 and about 50 pounds per 2000 pounds of phosphate rock, said water being added to the mixture in an amount sufficient to provide a total moisture content of between about 10% and about 20%, tumbling said mixture in a rotating pelletizer to produce moist pellets of phosphate rock particles bound together, said pellets having a particle size of plus 8 mesh, and slowly heating the moist pellets to a temperature in excess of about 230° F. to remove substantially all of the water from the pellets.

2. The method of claim 1 wherein all of the phosphate rock particles pass through a 14 mesh screen and between about 30% and about 60% by weight pass through a 200 mesh screen.

3. The method of claim 1 wherein alkali metal metaphosphate is sodium metaphosphate.

4. The method of claim 1 wherein alkali metal metaphosphate is added to the mixture in an amount equivalent to between about 10 and about 20 pounds per 2000 pounds of phosphate rock.

5. The method of claim 1 wherein water is added to the mixture in an amount equivalent to between about 11% and about 18% by weight.

6. The method of claim 1 wherein the moist pellets are heated to a temperature between about 500° F. and about 1200° F.

7. The method of claim 1 wherein the temperature of the moist pellets is increased from ambient temperature at a rate of between about 10° F. and about 25° F. per minute.

8. The method of preparing pellets of phosphate rock which comprises mixing particles of a phosphate rock concentrate obtained by the beneficiation of phosphate ore with phosphate dust particles, all of the particles in said mixture passing through a 14 mesh screen, and between about 30% and about 60% by weight of the particles passing through a 200 mesh screen, tumbling said mixture in an inclined rotating pelletizer with an aqueous solution of sodium metaphosphate in an amount between about 10 and about 20 pounds of sodium metaphosphate per 2000 pounds of said mixture, the water content of said equeous solution being equivalent to between about 10% and about 20% of the total weight of said moistened mixture, recovering moist pellets of phosphate particles bound together from the pelletizer, the major portion of said pellets having a particle size of about −1½″ +8 mesh, slowly heating the moist pellets to a temperature between about 500° F. and about 1200° F., heating said moist pellets from ambient temperature to the final temperature at the rate of between about 10°F. and about 25° F. per minute, whereby substantially all of the water is removed from the pellets.

9. Pellets for use as a constituent of the charging stock for a phosphorus reduction furnace which are resistant to breaking and dusting during shipment and handling and which result from heat treating at a temperature of at least about 230° F. which pellets consist essentially of phosphate rock particles substantially all of a size less than about 14 mesh and at least 30% of a size less than about 100 mesh bound together with a binder consisting essentially of a phosphate material selected from the group consisting of alkali metal metaphosphates, alkali metal polymetaphosphates, and mixtures thereof, said phosphate material being present in an amount equivalent to between about 5 and about 50 pounds of said phosphate material per 2000 pounds of phosphate rock.

10. The pellets of claim 9 wherein said alkali metal metaphosphate is sodium metaphosphate.

11. The pellets of claim 9 wherein said phosphate material is added in an amount equivalent to between about 10 and about 20 pounds of said phosphate material per 2000 pounds of phosphate rock.

References Cited in the file of this patent

UNITED STATES PATENTS

| | | |
|---|---|---|
| 1,790,220 | Balz et al. | Jan. 27, 1931 |
| 2,136,793 | Gabeler et al. | Nov. 15, 1938 |
| 2,191,199 | Hall | Feb. 20, 1940 |
| 2,762,698 | Barnes | Sept. 11, 1956 |
| 2,837,418 | Seymour | June 3, 1958 |